G. A. CULVER.
PRESSURE ALARM FOR PNEUMATIC TIRES.
APPLICATION FILED APR. 5, 1913.

1,133,269.

Patented Mar. 30, 1915.

Witnesses.
Robert C Palmer.

Inventor:
GEORGE A. CULVER
by Earl M Sinclair
Atty

UNITED STATES PATENT OFFICE.

GEORGE A. CULVER, OF BEATRICE, NEBRASKA, ASSIGNOR OF ONE-HALF TO THOMAS W. KEENAN, OF SHENANDOAH, IOWA.

PRESSURE-ALARM FOR PNEUMATIC TIRES.

1,133,269.  Specification of Letters Patent.  Patented Mar. 30, 1915.

Application filed April 5, 1913. Serial No. 759,570.

*To all whom it may concern:*

Be it known that I, GEORGE A. CULVER, citizen of the United States of America, and resident of Beatrice, Gage county, Nebraska, have invented a new and useful Pressure-Alarm for Pneumatic Tires, of which the following is a specification.

The object of this invention is to provide means adapted to be mounted on a pneumatic tire and designed to sound an audible alarm or signal when the pressure within said tire falls below a certain point.

A further object of this invention is to provide a device of the class described adapted to be mounted on the valve tube of a pneumatic tire and designed to overcome the valve spring when the pressure within said tire has been reduced below a predetermined and variable danger point, thereby permitting the escape of air through said tube to the end of sounding an audible alarm or signal.

A further object of this invention is to provide improved means for adjusting a pressure alarm for operation at variable degrees of pressure within a tire.

My invention consists in the construction, arrangement and combination of elements hereinafter set forth, pointed out in my claims and illustrated by the accompanying drawings, in which—

Figure 1:
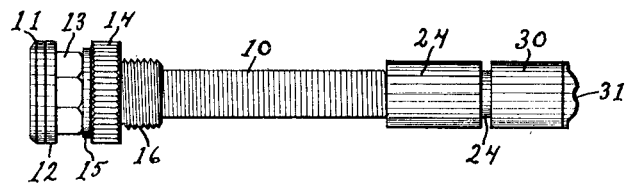
Figure 2:
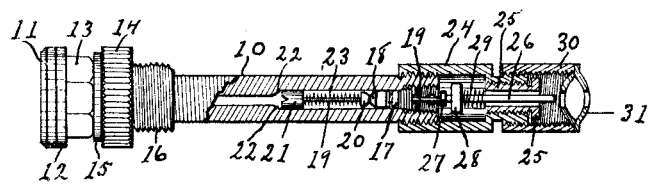
Figure 3:
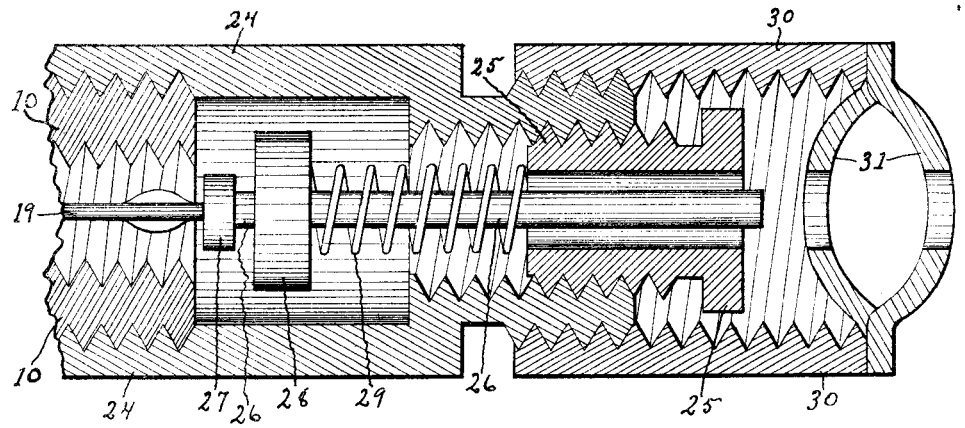

Figure 1 is an elevation illustrating my improved device mounted on a valve tube. Fig. 2 is a longitudinal sectional elevation of the same. Fig. 3 is a longitudinal section of the device on an enlarged scale.

It is a fact well known to users of automobiles and other vehicles equipped with pneumatic tires that a large proportion of the tire troubles and damage are occasioned by running the vehicle on insufficiently inflated, or partially deflated, tires, the air in many cases having been lost through slow leaks the presence of which is unsuspected by the operator. This use of a partially deflated tire will often result in cutting the tire to pieces and irreparably damaging it before its condition is suspected by the operator, and I have provided means in this invention for overcoming this difficulty by the attachment of an audible signal or alarm to the valve tube of the tire, which signal or alarm is operated by the release of air through the valve when the pressure in said tire has fallen below a predetermined danger point, which is variable according to the conditions under which the tire is used.

In the construction and mounting of the device as shown the numeral 10 designates a valve tube of any suitable construction, which tube preferably is exteriorly threaded. The tube 10 is formed with an integral head 11 and removable washer 12 at its base adapted to engage opposite surfaces of an inner tube of a pneumatic tire (not shown). A nut 13 is screwed on the tube 10 and is adapted to engage the outer face of a wheel rim (not shown), and a binding nut 14 is also screwed on said tube and adapted to engage the nut 13, a leather washer, such as 15, ordinarily being interposed between said nuts. The binding nut is formed with an upwardly extending, exteriorly threaded neck portion 16 adapted to receive attachment of an interiorly threaded closing cap or hood of common form (not shown) adapted to cover the entire tube 10 and valve members. The valve tube 10 is interiorly threaded at its tip and a binding nut 17, carrying a valve seat 18 at its lower end, is screwed therein. A valve stem 19 is mounted through the nut 17 and valve seat 18 and a valve 20 is fixed to said stem below said seat. The valve stem 19 extends into the tube 10 beyond the valve 20 and a head 21 is slidingly mounted thereon and engages an annular shoulder 22 within the bore of the tube 10 which limits downward movement thereof. The stem 19 is provided with means (not shown) engaging the head 21 and limiting outward movement of said stem relative to said head. An expansive spring 23 is coiled around the lower portion of the stem 19 and impinges at its ends the head 21 and valve 20 respectively. It is the function of the spring 23 to hold the valve 20 normally against the seat 18 and prevent egress of air through the tube 10. Downward movement of the stem 19 through the head 21, due to pressure applied manually or through the use of an air pump, acting against the resilience of the spring 23, results in unseating the valve 20 and permitting either the escape of air through the tube 10 or the introduction of air therethrough to the tire.

The parts and members thus far described are common and well known in the art to which they pertain and comprise one of the most widely known and effective tire valves on the market. They have been here shown and described in detail only to form the basis for the application of my invention.

A casing 24 of tubular form is screwed on the exteriorly threaded tip of the tube 10 and an adjusting nut 25 is screwed into the interiorly threaded outer end portion of said casing. A plunger 26 is loosely mounted in the casing 24 and nut 25 and is formed with a head 27 on its inner end adapted to engage and apply pressure at times on the outer end portion of the valve stem 19. A collar 28 is formed on or fixed to the plunger 26 above the head 27 and said collar is adapted to engage the outer end of the tip of the tube 10 and limit downward movement of the plunger 26 therein. An expansive spring 29 is coiled around the plunger 26 and impinges at its ends the collar 28 and adjusting nut 25 respectively. It is the function of the spring 29 to cause the plunger 26 to apply pressure on the valve stem 19, and it is the function of the adjusting nut 25 to regulate the tension of the spring 29 and determine the degree of such pressure. The casing 24 preferably is reduced at its outer end and is threaded exteriorly, and a cap 30 is adapted to be screwed thereon, over the adjusting nut 25. The cap 30 carries at its outer end a signaling device or audible alarm such as a whistle 31. I have here shown a whistle of the double disk variety, which is simple and occupies small space, but it is to be understood that any suitable form of whistle may be employed.

In practical use the signaling device, including the casing 24 and members carried thereby, is removed from the tube 10 during the process of inflation of the tire. The tire is then inflated to the degree, as shown by a tire pressure gage, which is believed to be the minimum pressure that can be used with safety, such for instance as forty pounds. The casing 24 is then mounted on the tube 10 in the position which it will occupy in use, and the cap 30 and whistle are removed to give access to the adjusting nut 25. The adjusting nut is then adjusted to the desired position in the outer end of the casing 24, to compress the spring 29 to the desired degree. It will be understood that the tension of the valve spring 23 is dependent on the degree of pressure within the tire, owing to outward pressure on the head 21; and that by adjustment of the nut 25 the tension of the spring 29 may be made to equal the tension of said spring 23. Consequently, after such equalization has been effected, a reduction of the pressure within the tire will cause a reduction of the tension of the spring 23 and permit the plunger 26, under the influence of the spring 29, to move against the valve stem 19, open the valve and permit the escape of air from the tire. When this adjustment has been secured, or when the plunger 26 is moved down to a position where it begins to open the valve, the casing 24 is removed from the tube 10 and the inflation continued to the desired extent. The casing 24 is then replaced on the tube 10 and the cap 30, with its whistle, is screwed in place, and the ordinary closing cap or hood (not shown) may be screwed in place over all. Now it will readily be understood that when the pressure within the tire from any cause falls below the predetermined minimum of safety, such as forty pounds, the spring 29 will cause the valve to open as above described, and the air escaping from the tire through the tube 10, casing 24, adjusting nut 25 and cap 30 will cause the whistle 31 to sound and convey a signal to the operator that one of his tires requires attention. This will obviously prevent much damage to tires.

I claim as my invention—

1. The combination with a pneumatic tire inflation valve, of a low pressure signal device comprising a casing connected to the outer end of the valve tube, a hollow adjusting nut threaded into the outer end of said casing, a plunger mounted within said casing and nut centrally thereof and coaxial with the stem of said valve and having the inner end thereof in engagement with the adjacent end of the valve stem, a collar fixed to said plunger, an expansion spring surrounding said stem between said collar and nut and adapted to be placed under tension by said nut whereby said plunger will move inwardly and open the valve against its spring when the pressure within the tire has fallen below a predetermined point, and a signal operated by air passing through the hollow nut and adapted to sound upon the opening of said valve.

2. The combination with a pneumatic tire inflation valve, of a low pressure signal device comprising a casing connected to the outer end of the valve tube, a hollow adjusting nut threaded into the outer end of said casing, a plunger mounted within said casing and nut centrally thereof and coaxial with the stem of said valve and having the inner end thereof in engagement with the adjacent end of the valve stem, a collar fixed to said plunger adjacent to the inner end thereof, an expansion spring surrounding said stem between said collar and nut and adapted to be placed under tension by said nut whereby said plunger will move inwardly and open the valve against its spring when the pressure within the tire has fallen below a predetermined point, and a signal connected to the outer end of said casing and adapted to sound upon the opening of said valve.

3. The combination with a pneumatic tire inflation valve, of a low pressure signal device comprising a casing connected to the outer end of the valve tube, a hollow adjusting nut threaded into the outer end of said casing, a plunger mounted within said casing and nut centrally thereof and coaxial with the stem of said valve and having the inner end thereof in engagement with the adjacent end of the valve stem a collar fixed to said plunger adjacent to the inner end thereof, an expansion spring surrounding said stem between said collar and nut and adapted to be placed under tension by said nut whereby said plunger will move inwardly and open the valve against its spring when the pressure within the tire has fallen below a predetermined point, a cap threaded onto the outer end of said casing concentrically of said plunger, and a signal carried by said cap and coaxial therewith.

4. The combination with a pneumatic tire inflation valve, of a low pressure signal device comprising a casing connected to the outer end of the valve tube and having the outer end thereof circumferentially reduced, a hollow adjusting nut threaded into the outer end of said casing, a plunger mounted within said casing and nut centrally thereof and coaxial with the stem of said valve, a head on the inner end of said stem and in engagement with said valve stem, a collar fixed to said plunger adjacent to said head, an expansion spring surrounding said stem between said collar and nut and adapted to be placed under tension by said nut whereby said plunger will move inwardly and open the valve against its spring when the pressure within the tire has fallen below a predetermined point, a cap threaded onto the reduced end of said casing concentrically of said plunger, and a signal carried by said cap and coaxial therewith.

Signed by me at Des Moines, Iowa, this twenty-ninth day of March, 1913.

GEORGE A. CULVER.

Witnesses:
W. W. FINK,
EARL M. SINCLAIR.